(12) United States Patent
Longman et al.

(10) Patent No.: US 11,209,537 B2
(45) Date of Patent: Dec. 28, 2021

(54) EXTENDED TARGET-MATCHED CFAR DETECTOR

(71) Applicant: GM GLOBAL TECHNOLOGY OPERATIONS LLC, Detroit, MI (US)

(72) Inventors: Oren Longman, Tel Aviv (IL); Gaston Solodky, Haifa (IL); Shahar Villeval, Tel Aviv (IL); Igai Bilik, Rehovot (IL)

(73) Assignee: GM Global Technology Operations LLC, Detroit, MI (US)

( * ) Notice: Subject to any disclaimer, the term of this patent is extended or adjusted under 35 U.S.C. 154(b) by 328 days.

(21) Appl. No.: 16/444,648

(22) Filed: Jun. 18, 2019

(65) Prior Publication Data

US 2020/0400809 A1 Dec. 24, 2020

(51) Int. Cl.
*G01S 13/56* (2006.01)
*G01S 13/931* (2020.01)
*B60W 50/14* (2020.01)
*G05D 1/02* (2020.01)

(52) U.S. Cl.
CPC ............. *G01S 13/56* (2013.01); *B60W 50/14* (2013.01); *G01S 13/931* (2013.01); *B60W 2420/52* (2013.01); *G05D 1/0257* (2013.01)

(58) Field of Classification Search
CPC ...... G01S 13/56; G01S 13/931; B60W 50/14; B60W 2420/52; G05D 1/0257
See application file for complete search history.

(56) References Cited

U.S. PATENT DOCUMENTS

2018/0275259 A1* 9/2018 Ott .................... G01S 13/5246

* cited by examiner

*Primary Examiner* — Michael D Lang
(74) *Attorney, Agent, or Firm* — Quinn IP Law (57) ABSTRACT

A radar circuit for use with a host system such as a vehicle includes a radio frequency (RF) signal generator configured to generate a predetermined RF waveform, an RF antenna connected to the RF signal generator, and an ECU which executes a method. As part of such a method, a signal generator transmits the RF waveform toward different radar target types, and receives return signatures reflected therefrom. The ECU receives the return signatures from the antenna, processes the return signatures via parallel constant false-alarm rate (CFAR) subdetectors each with defined cells under test to detect the target types as a set of detection events, merges the detection events into a merged set, and executes a control action aboard the host system responsive to the merged set. Each subdetector detects a corresponding one or more of the radar target types via corresponding detection parameters.

20 Claims, 5 Drawing Sheets

EXTENDED TARGET-MATCHED CFAR DETECTOR

INTRODUCTION

Radar systems are often employed to assist in the detection and localization of potential obstacles in proximity to a host device. When a radar system is used aboard a motor vehicle, for example, the radar system may be used to detect other vehicles, pedestrians, and stationary objects in real-time. Radar is therefore an enabling technology for various driver assist subsystems, regardless of whether the driver is a human operator, or the motor vehicle is autonomously-controlled. Such subsystems may include adaptive cruise control, automatic lane-changing/lane-keeping, automatic braking or steering, backup assistance, etc. Radar-based obstacle detection is also used to enhance the overall situational awareness of a vehicle operator by triggering timely alerts.

In a typical radar system, pulsed or continuous-wave radio frequency (RF) or other electromagnetic spectrum energy is transmitted as a calibrated set of radio waves in a predetermined scanning direction, such as a forward, lateral, and/or rear direction relative to a vehicle body. If the transmitted RF waveform encounters a sufficiently reflective object as the waveform propagates through free space, some of the initially-transmitted energy is reflected back toward the host, whereupon the reflected energy is received by an antenna. The corresponding return signature is then processed using signal processing hardware and software. In this manner, a radar system is able to quickly determine the direction (i.e., azimuth and elevation) and a corresponding range to a detected target.

SUMMARY

Disclosed herein is an improved radar circuit for use with a driver assist system as generally described above. The term "driver" may encompass human operators as well as robotic ones, e.g., autonomously-controlled vehicle applications. "Assist" may include torque, braking, and/or steering assistance that is automatically provided by an associated electronic control unit (ECU) when controlling a present operating state of a vehicle or other host system, as well as to activation of audible, visible, and/or tactile warnings, with or without the above-noted actuator control.

The radar circuit described herein includes a transmitter, a receiver, and an ECU. The ECU includes multiple Constant False Alarm Rate (CFAR) subdetectors operating in parallel. Each CFAR subdetector has optimized parameters tuned to detecting a specific target type. Each CFAR subdetector may have a different plural number of cells under test, as explained herein, e.g., a 2×1 array (two cells under test) and a 3×5 array (fifteen cells under test). The outputs of the parallel detectors ("detection events") may be subsequently merged or otherwise combined/consolidated, such as by using an object-level processing subroutine, with control logic ultimately resolving multiple detections generated by the various parallel detectors according to a predetermined rule. A subsystem is thereafter controlled in response to the detection events.

As will be appreciated by those of ordinary skill in the art, vehicles and other host systems may use a technique referred to as Constant False-Alarm Rate (CFAR) detection to positively identify radar targets from associated background noise via energy or power-based spectral analysis. In a typical CFAR detector, a single point cell under consideration is used across a range of potential radar targets, with an energy threshold. For example, in a vehicle radar system the CFAR detector is required to detect cars, trucks, motorcycles, pedestrians, trees, and roadside barriers together with the same single point cell detector. However, the detection performance of such CFAR detectors may be less than optimal, either leading to a low false alarm rate with a high number of undetected targets or a high false alarm rate with a low number of undetected targets. The present approach is tailored to improving upon such state of the art CFAR detectors and thereby increasing overall detection performance.

In a particular embodiment, the radar circuit includes a radio frequency (RF) signal generator, an RF antenna, and an ECU. The signal generator is configured to generate a predetermined RF waveform. The RF antenna, which is connected to the RF signal generator, is configured to transmit the RF waveform toward a plurality of radar targets of different target types, and to receive radar return signatures therefrom. The ECU is configured to receive the radar return signatures from the RF antenna, process the radar return signature via a plurality of parallel CFAR subdetectors to thereby detect the radar targets as a set of detection events, and execute a control action aboard the host system responsive to a merged set of the detection events.

In such an embodiment, each respective one of the CFAR subdetectors is configured to detect a corresponding one or more of the radar target types via corresponding detection parameters for a given one or more of the different target types, with the parameters being inclusive of the defined cells under test for each of the CFAR subdetectors. The ECU is also configured to merge the set of detection events into the merged set and thereafter execute a control action aboard the host system responsive to the merged set.

Each CFAR subdetector may be configured to detect one or more of the radar target types from amongst the different radar target types by comparing the power or energy threshold to a power or energy level of the respective cells under test.

The ECU, when processing the radar return signatures, may be configured to generate a range-Doppler beam map.

The ECU may merge the set of detection events or pass all of the detection events using an object-level processing subroutine.

The ECU may be configured to selectively reject at least some detection events from the set of detection events using the object-level processing subroutine.

In some embodiments, the control action includes activating an alert aboard a vehicle, with the vehicle being the host system. For example, the vehicle may be a motor vehicle having a driver assist subsystem. The control action could include changing a dynamic state of such a motor vehicle via transmission of control signals to the driver assist subsystem.

Also disclosed herein is a method for detecting radar targets in a host system. In an exemplary embodiment, the method may include generating a predetermined radio RF waveform using an RF signal generator, and then transmitting the RF waveform, via an RF antenna connected to the RF signal generator, away from the host system and toward a plurality of different radar target types. The method may also include receiving radar return signatures from at least some of the different radar target types via the RF antenna, and processing the radar return signatures using the ECU and a plurality of parallel CFAR subdetectors to thereby detect the radar target types as a set of detection events. Such processing may include detecting, via each respective one of the CFAR subdetectors, with each subdetector having defined cells under test, a respective one of the radar target types via corresponding detection parameters. The method may also include merging the set of detection events, via the ECU, into a merged set of the detection events, and thereafter executing a control action aboard the host system via the ECU responsive to the merged set of the detection events.

A vehicle is also disclosed herein that includes a vehicle body and the radar circuit noted above, which is connected to the vehicle body.

The above summary is not intended to represent every embodiment or every aspect of the present disclosure. Rather, the foregoing summary merely provides an exemplification of some of the novel aspects and features set forth herein. The above features and advantages, and other features and advantages of the present disclosure, will be readily apparent from the following detailed description of representative embodiments and modes for carrying out the present disclosure when taken in connection with the accompanying drawings and the appended claims.

The present disclosure is susceptible to various modifications and alternative forms, and some representative embodiments have been shown by way of example in the drawings and will be described in detail herein. It should be understood, however, that the inventive aspects of this disclosure are not limited to the particular forms disclosed. Rather, the disclosure is to cover all modifications, equivalents, combinations, subcombinations, and alternatives falling within the spirit and scope of the disclosure as defined by the appended claims.

DETAILED DESCRIPTION

Figure 1:
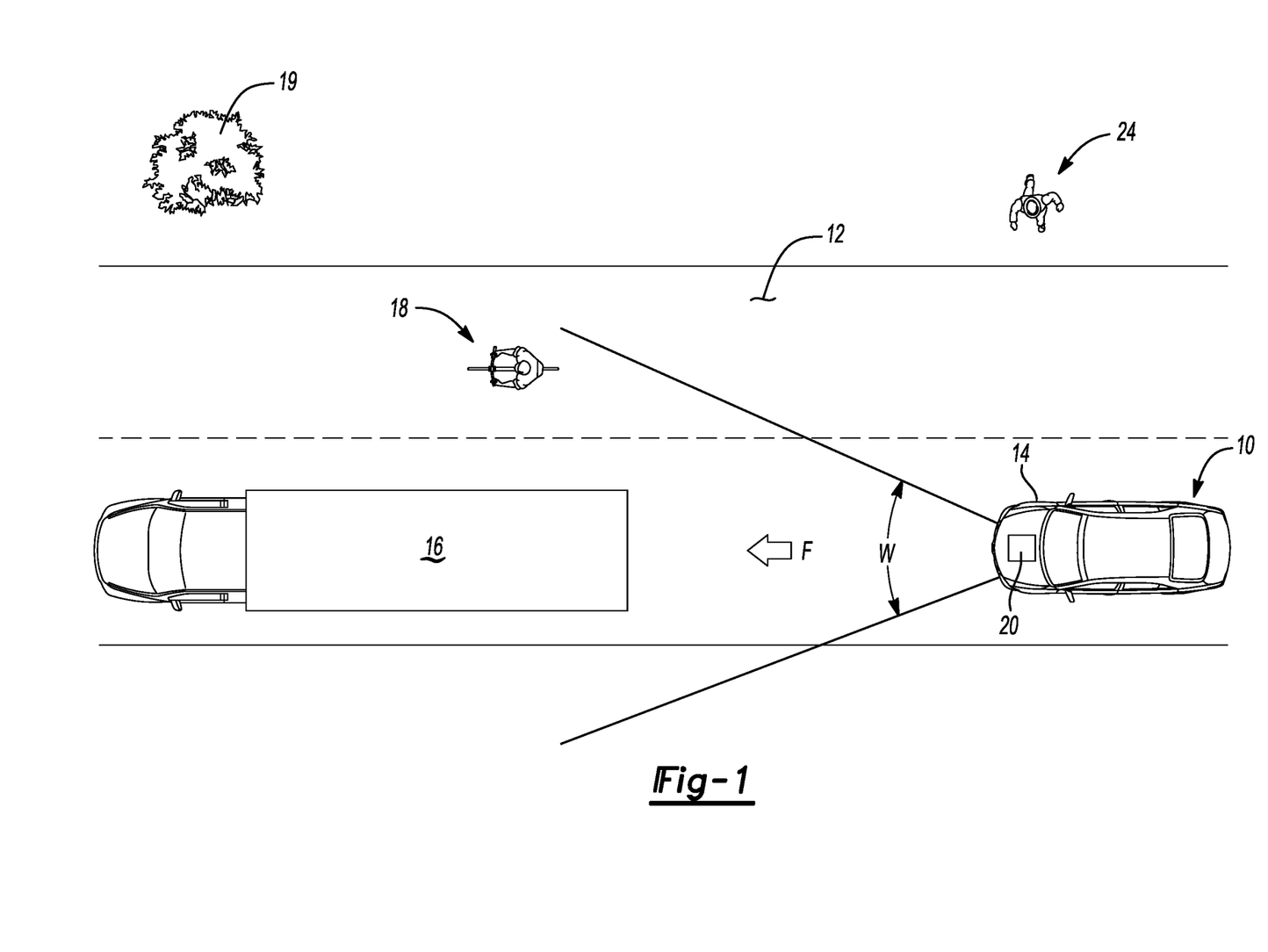
FIG. 1 is a schematic illustration of an example host vehicle having a radar circuit constructed with multiple parallel CFAR subdetectors as set forth herein.

Referring to the drawings, wherein like reference numbers refer to like components, a host vehicle 10 is depicted schematically in FIG. 1. The host vehicle 10 in the illustrated embodiment is a motor vehicle. However, those of ordinary skill in the art will appreciate that other vehicles may benefit from the present teachings, including but not limited to watercraft, aircraft, and rail vehicles, or other mobile systems such as robots or mobile platforms. Stationary host systems may also benefit from the present teachings. For illustrative consistency, the host vehicle 10 will be described hereinafter as a motor vehicle without limiting the scope of the disclosure to such an embodiment.

The host vehicle 10 includes a vehicle body 14 and a radar circuit 20, an example embodiment of the latter being described in detail below with reference to FIG. 2. The host vehicle 10, when optionally configured as a motor vehicle as shown, may travel in the general direction of arrow F along a road surface 12. The host vehicle 10 may at times encounter obstacles while traveling on the road surface 12. For instance, the host vehicle 10 may encounter other vehicles such as a truck 16 or a motorcycle 18, and may likewise encounter stationary objects 19 such as trees, bushes, posts, signs, or traffic barriers, or guard rails. Likewise, smaller obstacles such as pedestrians 24 may be present in the general vicinity of the host vehicle 10, such as when waiting to cross an intersection or walking on or alongside the road surface 12.

In order to more accurately detect the various obstacles shown in FIG. 1 or other obstacles not described herein, the radar circuit 20 is configured to generate and transmit a radar beam of width (W). The radar beam is transmitted in a predetermined direction with respect to the vehicle body 14, e.g., forward in the direction of travel (arrow F) as shown, or in lateral or rearward positions depending on the present operating mode of the host vehicle 10. The radar circuit 20 may be variously configured to transmit the radar beam with an application-specific frequency, power, and detection range. For instance, the radar circuit 20 may generate linear-frequency-modulated continuous-wave (LFM-CW) radar signals in some embodiments.

Figure 2:
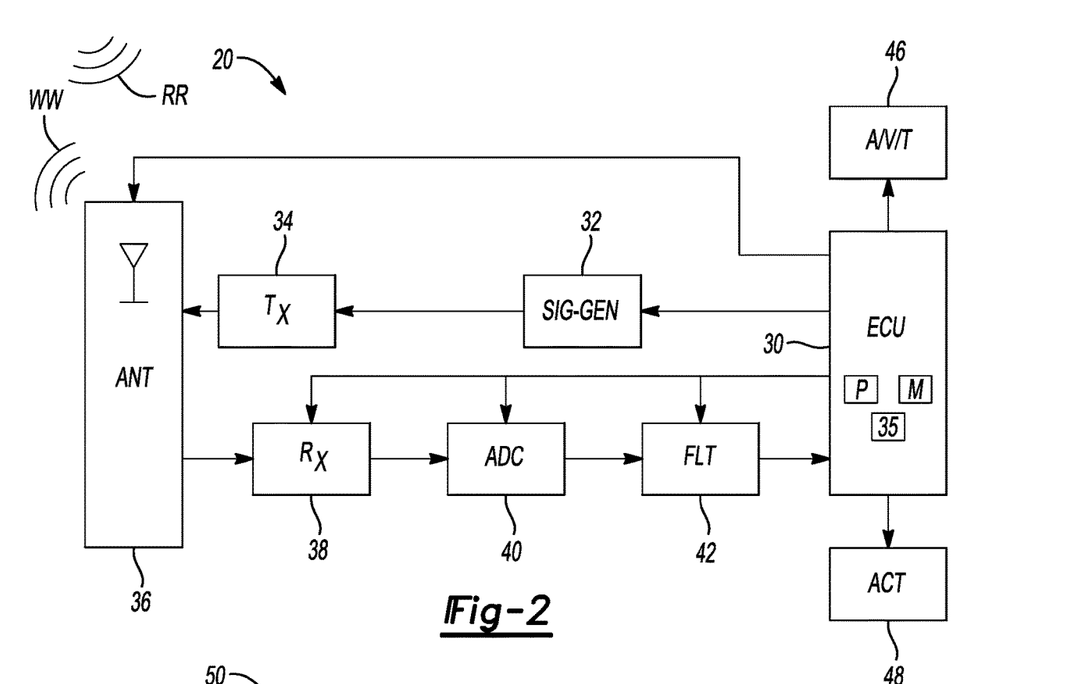
FIG. 2 is a schematic circuit diagram of an exemplary radar circuit having the above-noted parallel, target-specific CFAR subdetectors.

Referring to FIG. 2, the radar circuit 20 of FIG. 1 includes an electronic control unit (ECU) 30 that is programmed with Constant False-Alarm Rate (CFAR) detection logic 35 as described below. The ECU 30 may be an integral module of, or a separate module operatively connected to, other resident controllers of the host vehicle 10. The ECU 30 may be variously embodied as one or more digital computers including a processor (P), e.g., a microprocessor or central processing unit, as well as memory (M) in the form of read only memory, random access memory, electrically-programmable read only memory, etc. The ECU 30 may also include a high-speed clock, analog-to-digital and digital-to-analog circuitry, input/output circuitry and devices, and appropriate signal conditioning and buffering circuitry.

In a representative embodiment, hardware components of the radar circuit 20 may include an RF signal generator (SIG-GEN) block 32 configured to generate a predetermined RF waveform, an RF transmitter (Tx) 34, and an RF antenna (ANT) 36 connected to the RF signal generator block 32 and configured to transmit the RF waveform (WW) away from the host vehicle 10 and toward prospective targets of different radar target types, and to receive radar return signatures (RR) reflected by at least some of the prospective targets as set forth herein. The ECU 30 is configured to control operation of the signal generator 32 to initiate an application-suitable radar beam, with the RF transmitter 34 ultimately producing pulses of an application-specific RF energy responsive to outputs from the signal generator 32. The energy pulses are then radiated into free space in a desired direction of propagation by the RF antenna 36. Upon reflection from an obstacle (potential radar target), the radar return signals are received as the above-noted return signature by the RF antenna 36, and thereafter possibly amplified and demodulated via an RF receiver (Rx) 38. The received signals (analog) are then converted to a digital signal via an analog-to-digital converter (ADC) 40.

The digital output of the ADC 40 may be optionally filtered via a filtering block (FLT) 42, e.g., using a Doppler filter. The filtered digital signal is then fed into the ECU 30 for processing and target detection via the CFAR logic block 35 of the present disclosure. Ultimately, the ECU 30 uses the RF energy threshold-based detections of the CFAR logic block 35 to execute control actions responsive to such detection results. For instance, the ECU 30 may activate an audio, visual, and/or tactile (A/V/T) device 46 to alert an operator of the vehicle 10 as to the detected target(s).

Example embodiments of device 46 may include speakers, lights, and/or vibrating or pulsating seat or steering wheel surfaces. The ECU 30 may transmit control signals to an actuator (ACT) 48. For instance, the actuator 48 may be a controlled portion of a driver assist subsystem such as but not limited to adaptive cruise control, automatic braking or steering assist, high-beam on/off state, lane-changing/lane-keeping, backup, parking, and/or towing assist, etc. Thus, the control actions governed by the ECU 30 may result in a change of dynamic and/or logical operating state of the host vehicle 10, e.g., via transmission of control signals to the actuator(s) 48 for the driver assist subsystem.

Figure 3:
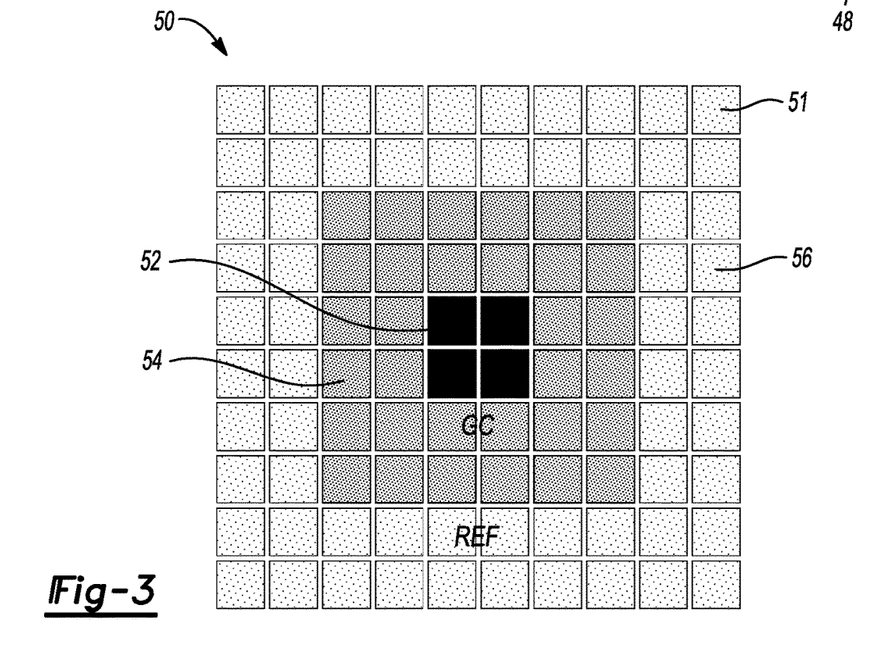
FIG. 3 is a schematic illustration of a representative detection area depicting cells-under-test, guard cells, and reference cells according to the present teachings.

The CFAR logic bock 35 is described below with reference to FIGS. 4 and 5 may be understood with reference to cell map 50 of FIG. 3, which in general will be recognized by one of ordinary skill in the art of CFAR-based target detection, with the noted distinctions. The cell map 50 used herein is an array of energy cells 51 of a predetermined size and shape, e.g., a one hundred cell (10×10) cell map 50 as shown. A cell map 50 having different number of constituent cells 51 may also be used within the scope of the disclosure, and therefore the illustrated example (10×10) cell map 50 of FIG. 3 is illustrative of the present teachings and non-limiting.

At the center of the cell map 50 is a plurality of cells-under-test 52, also referred to as CUT cells 52. Unlike typical CFAR detectors, the CUT cells 52 are considered as a predefined area (multiple cells 51) as opposed to a single/point cell. In the illustrated example embodiment of FIG. 3, for instance, the CUT cells 52 may form a four cell (2×2) area. The CFAR detectors 62 may each use a different predefined number of CUT cells 52, e.g., a 2×1 array in one CFAR detector 62, a 3×5 array in another CFAR detector 62, or another application-specific variety of array sizes. The CUT cells 52 are surrounded by a predetermined number of guard cells (GC) 54, such as two guard cells 54 per side, which in turn are surrounded by a plurality of reference cells (REF) 56, with the reference cells 56 likewise shown with two cells 56 per side.

In general, a radar target is positively identified via evaluation of the CUT cells 52 when the energy level in the CUT cells 52 exceeds that of a local average power level. The CUT cells 52 define corresponding Doppler bins of digital information which collectively describes an energy or power level of the processed radar return signals noted above with reference to FIG. 2. The collective energy level of the CUT cells 52 is compared to an energy-based detection threshold using the CFAR logic 35. As part of the approach, energy information contained in the guard cells 54 surrounding the CUT cells 52 is purposefully excluded from subsequent noise level and target power estimations of the ECU 30. Power information in the reference cells 56 surrounding the guard cells 54, which are assumed to be free of radar targets, is used to estimate noise levels in the vicinity of the targets. Each CFAR subdetector used in parallel as part of the disclosed CFAR logic block 35 is therefore configured with its own corresponding cell map 50.

Thus, as part of the disclosed approach, the ECU 30 is configured to receive radar return signatures from the RF antenna 36 of FIG. 2, process the radar return signature via a plurality of parallel CFAR subdetectors 62, . . . , 62$n$ (FIG. 4) using the CFAR logic block 35, detect the radar targets as a set of detection events, and execute a control action aboard the host vehicle 10 responsive to a merged set of the detection events. The ECU 30 merges the set of detection events from the various CFAR subdetectors 62, . . . , 62$n$ into the merged set.

Figure 4:
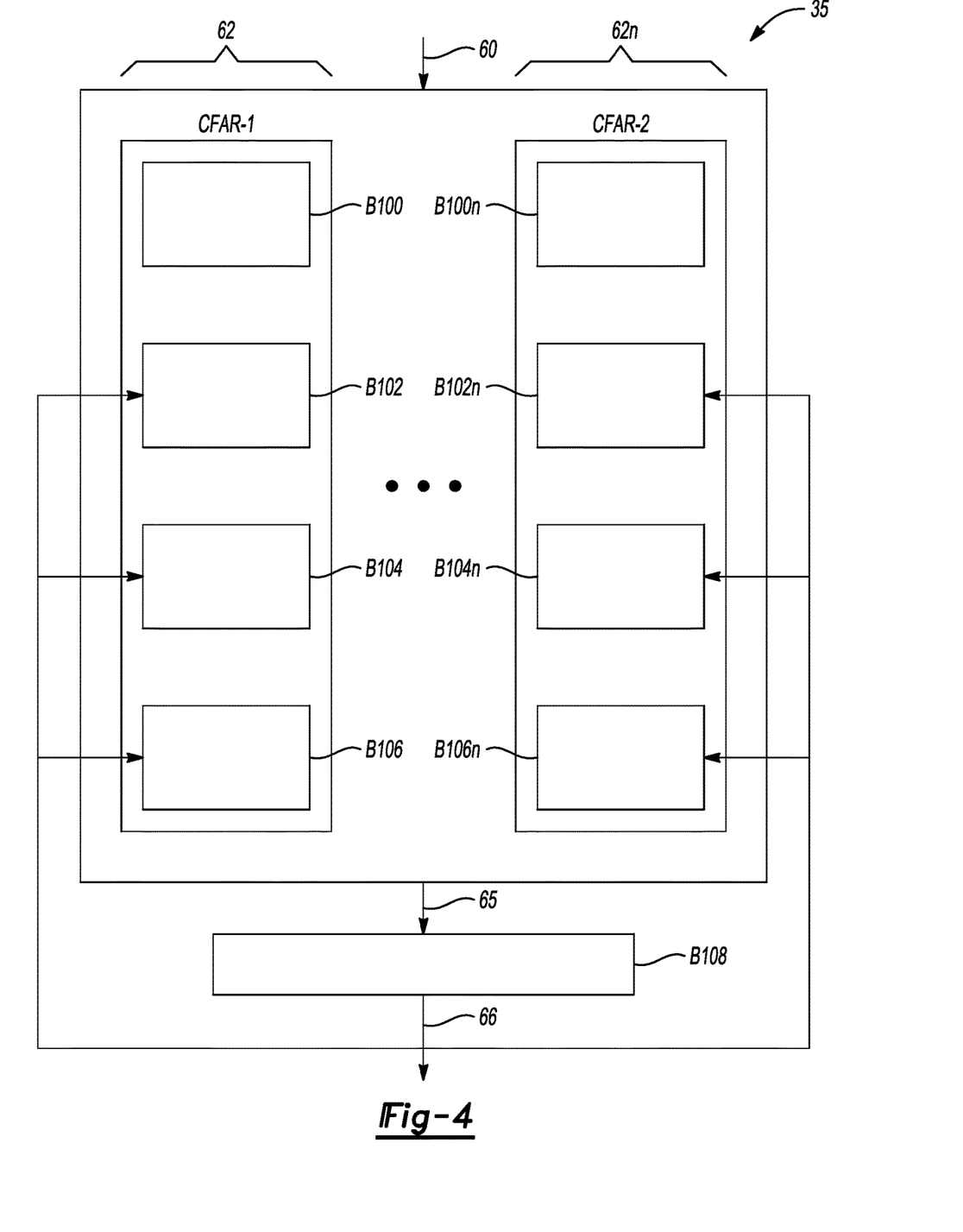
FIGS. 4 and 5 are logic flow diagrams describing radar target detection using multiple parallel CFAR subdetectors within the radar circuit of FIG. 2.

FIG. 4 depicts an example embodiment of the CFAR logic bock 35. A plurality (n) of parallel CFAR subdetectors 62 is used, with the $n^t$ CFAR subdetector 62 depicted as 62$n$. Each CFAR subdetector 62 uses corresponding logic blocks B100, B102, B104, B106, and B108 to generate a plurality of radar detection events 65. Other than the unique tuning of the CFAR subdetector 62$n$ to a different target as explained below, the corresponding logic blocks B100$n$, B102$n$, B104$n$, and B106$n$ of CFAR subdetector 62$n$ are essentially the same as those described herein for use with the CFAR subdetector 62, and therefore a separate description of CFAR subdetector 62$n$ is not necessary. The radar detection events 65 from the various CFAR subdetectors 62 are then fed into a shared logic block B108 for combination/merging of the various radar detection events 65 from the (n) CFAR subdetectors 62. Ultimately, the ECU 30 merges or otherwise combines the set of detection events into a merged set 66, which is thereafter used by the ECU 30 to execute appropriate control actions aboard the host vehicle 10 shown in FIG. 1.

Unlike CFAR detection schemes which utilize common "one-size-fits-all" detection parameters for different types of targets and ranges thereto, the present CFAR detection logic 35 instead employs multiple sets of target-specific detection parameters in parallel. Each of the multiple CFAR subdetectors 62, . . . , 62$n$ is individually optimized for a specific target type, e.g., trucks or other large vehicles, motorcycles or scooters, pedestrians or animals, or cyclists, or for a particular stationary obstacle such as guard rails, traffic barriers, or trees. Each set of parameters may be range-dependent, Doppler-dependent, azimuth-dependent, and elevation-dependent to better account for target spread in terms of range, velocity, and direction effects. Each CFAR subdetector 62 used as part of the present approach thus receives a range-Doppler beam map, represented as arrow 60, as an input, with such range-Doppler beam maps being understood by those of ordinary skill in the art.

Figure 5:
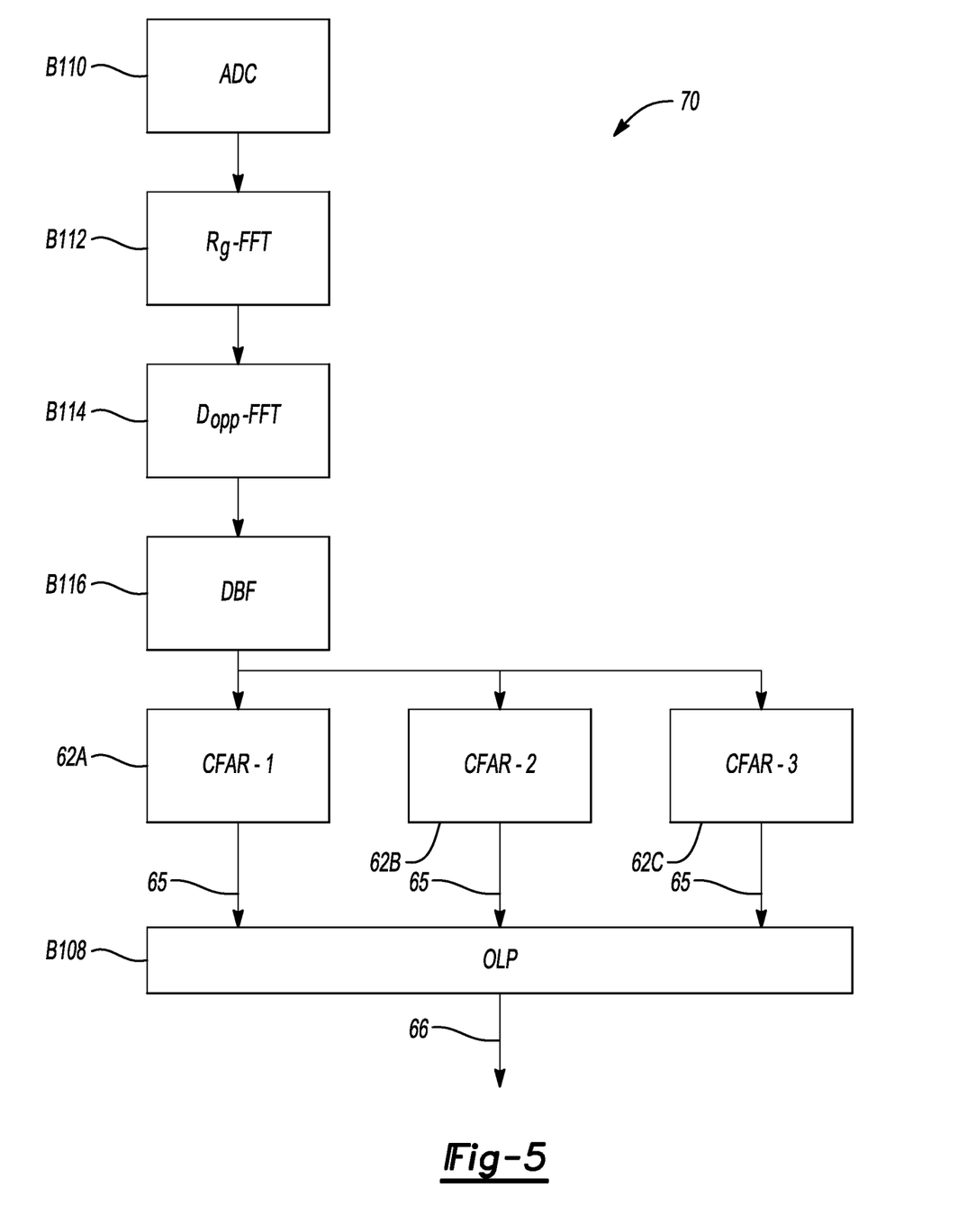

Referring briefly to the flowchart 70 of FIG. 5, and also as appreciated in the art of Doppler-based radar systems, the radar circuit 20 may sample digital outputs of the ADC 40 (FIG. 2) at a logic block B110 to generate digital samples, which are then fed into logic block B112. There, a fast-Fourier transform (FFT) process may be used to generate a range-chirp Rx channel map. Such a map is fed into logic block B114 where a Doppler-FFT process may be used to generate a range-Doppler Rx channel map ("RD map"). Logic block B116 may perform a digital beamforming process and thereby output the above-noted RD map as an input to the multiple parallel CFAR subdetectors 62, shown as representative CFAR subdetectors 62A, 62B, 62C in FIG. 5 (CFAR-1, CFAR-2, and CFAR-3, respectively).

Referring once again to FIG. 4, at logic block B100 the ECU 30 performs a loop on the collective set of detection candidates at the range-Doppler beam. The purpose of logic block B100 is to loop on detection candidates within the entire range-Doppler map. To do this, each CFAR detector 62 may take into account a few cells 51 at a time. In order to cover the entire RD map, a loop process is employed, which is represented as logic block B100. Such a process updates, at each iteration, the CUT cells 52 at the RD map, with the remaining cells, i.e., guard cells 54 and reference cells 56, similarly updated. At each loop iteration, the location is updated to test a new RD location for detection of possible radar target types, with the remaining blocks of the method 100 performed for the new location starting with logic block B102. The method 100 then proceeds to logic block B102.

At logic block B102 of FIG. 4, the ECU 30 may calculate a noise level by determining the collective energy of the reference cells 56, which as will be appreciated is a function of detection range, as the perceived projected Doppler spread of the target is range-dependent. The CUT cells 52 may be dynamically-adjusted by the ECU 30 in number, and may be expected to vary from one CFAR subdetector 62 to another as part of the present approach. Once the background noise level has been determined, the ECU 30 derives the power or energy threshold to apply to the CUT cells 52 at logic block B104, e.g., as a calculated power level in excess of the noise level of the reference cells 56. The ECU 30 feeds the energy threshold into logic block B106. There, the ECU 30 calculates the power level of the CUT cells 52 and thereafter compares the energy level to the energy threshold from logic block B104.

The result of logic block B102 is a set of detection events 65, e.g., one or more detection events, with such detection events 65 being specific to the CFAR subdetector 62 that made the detection. A given CFAR subdetector 62 may be configured to detect larger targets, such as trucks, by defining the CUT cells 52 to fit a particular truck type. In parallel, another CFAR subdetector 62 may be configured to detect smaller targets such as motorcycles. The guard cells 54 and reference cells 56 are thereafter assigned, e.g., using a predetermined number of cells 51 or as a function of the size of the CUT cells 52 or area thereof.

That is, each of the (n) CFAR subdetectors 62 outputs a set of detection events 65 to logic block B108. The detection events 65 may describe range, Doppler return, azimuth, elevation, and amplitude information for one or more radar targets. Logic block B108 may use an object-level processing subroutine to merge or otherwise combine the detection events 65, e.g., eliminating or selectively rejecting at least some of the detection events 65 from further consideration or by confirming the existence of other detection events 65 depending on the results of logic block B108. Logic block B108 ultimately outputs a merged set (arrow 66) as a final set of actionable detections, with the ECU 30 possibly activating device 46 of FIG. 2 and/or changing the dynamic or logical state of actuator 48 responsive to the merged set (arrow 66) of detection events.

A simplified implementation of logic block B108 includes passing all detections, regardless of the particular CFAR subdetector(s) 62 that detected the target. Alternatively, logic block B108 may filter out duplicate detections, e.g., by sorting detections into a particular range-Doppler-angle bin and thereafter sorting by magnitude. Detections having the strongest magnitude may be passed onward with a corresponding label for the particular CFAR subdetector 62 from which the detection originated.

Figure 6:
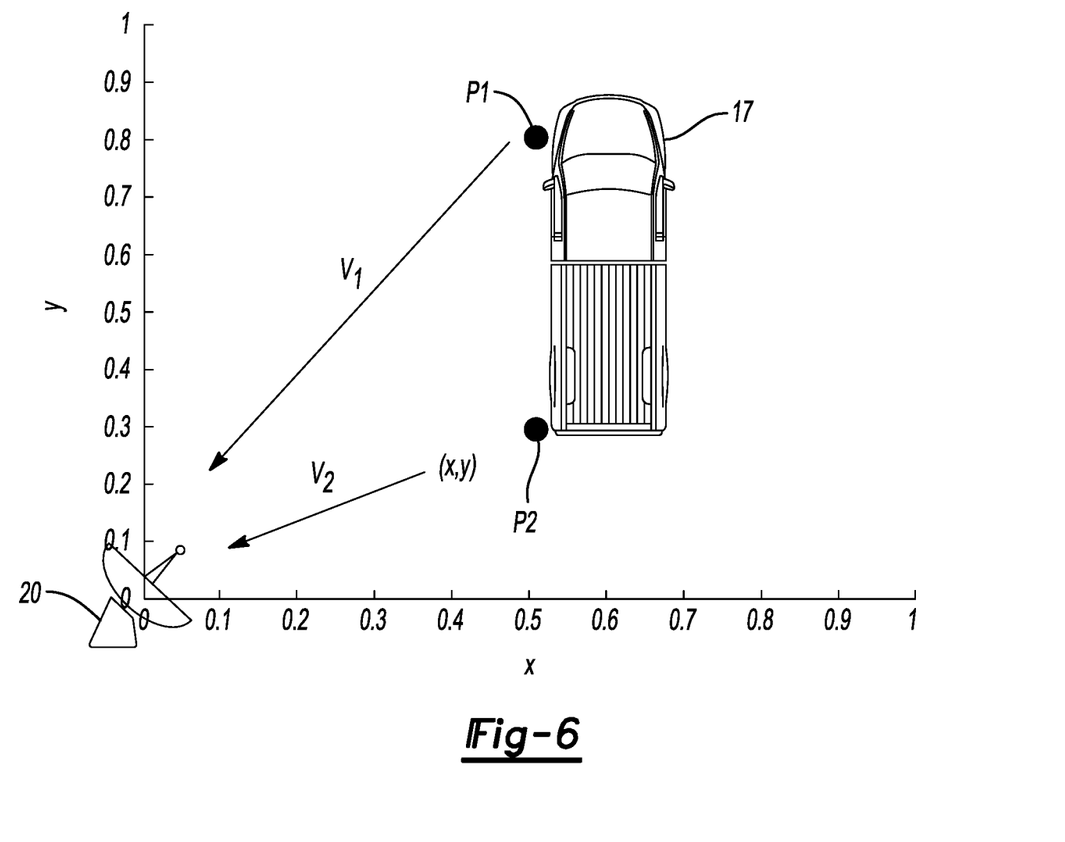
FIG. 6 is a schematic illustration of an example target vehicle in motion relative to a representative host vehicle.

The approaches of FIGS. 4 and 5 may be understood with reference to an example application in FIG. 6, which schematically depicts a dynamic target 17 moving with respect to the radar circuit 20, with the radar circuit 20 shown as an antenna for illustrative simplicity. Normalized distance is shown on the y- and x-axes. Vectors $V_1$ and $V_2$ represent velocity component of the dynamic target 17 at different reflectance points P1 and P2, and with the instantaneous position of the dynamic target 17 likewise having x-axis and y-axis components.

As used below, $R_{Target}$ represents the range to the dynamic target 17 and $Size_x$ and $Size_y$ represent the size of the dynamic target 17 in the respective x-axis and y-axis directions. As noted above, the respective parameters used in each of the multiple CFAR subdetectors 62 are tailored to the dimensions and other characteristics of a particular target type. The extent of the dynamic target 17 in the range dimension is based on the length of the target 17, i.e.:

$$\Delta R_{target} = \frac{Size_{target}}{\Delta R_{radar}}$$

where $Size_{target}$ is the maximal target length, i.e., the largest distance between two points of the target, $\Delta R_{radar}$ is the radar range resolution yielding $\Delta R_{target}$, which in turn is the number of candidate range cells for use as the CUT cells 52 for a given target type along the range dimension.

The Doppler spread, $\Delta V_{spread}$, is dictated by the target size along the x and y dimension ($Size_x$, $Size_y$) and velocity ($V_x$, $V_y$), as will be appreciated by those of ordinary skill in the art. The Doppler return of the dynamic target 17 is a function of radial velocity. That is, the dynamic target 17 has a particular Doppler spread, $\Delta V_{spread}$, due to velocity projections at the different reflection points P1 and P2. The number of candidate Doppler bins $\Delta D_{Target}$ for use as the CUT cells 52 may be calculated correspondingly as:

$$V_{spread} = \text{argmax} \frac{(x + Size_x)V_x + (y + Size_y)V_y}{\sqrt{(x + Size_x)^2 + (y + Size_y)^2}} - \frac{xV_x + yV_y}{\sqrt{x^2 + y^2}}$$

$$\Delta D_{Target} = V_{Spread} \Delta D_{radar}$$

where $V_{spread}$ is the velocity spread between vectors V1 and V2.

When setting an energy or power threshold in logic block B104 of FIG. 4, the ECU 30 may determine the average energy of the CUT cells 52 by summing the energy in the CUT cells 52 as follows:

$$z_{TH} = \frac{\alpha}{N} \sum_{n=1}^{N} |z_n|^2$$

where $z_n$ is the amplitude of the $n^{th}$ test cell of the CUT cells 52 and N is the number of CUT cells 52.

As will be appreciated by those of ordinary skill in the art, a method for detecting radar targets in the host vehicle 10 or other host system is enabled by the foregoing disclosure. For instance, such a method may include generating a predetermined RF waveform using the RF signal generator 32 of FIG. 1, and then transmitting the RF waveform (WW of FIG. 2) via the RF antenna 36 which is connected to the RF signal generator 32, away from the host vehicle 10 and toward a plurality of different radar target types (see FIG. 2). The RF antenna 36 then receives radar return signatures (RR of FIG. 2) as reflected by at least some of the different radar target types, and the ECU 30 thereafter processes the radar return signatures using the above-described parallel CFAR subdetectors 62, . . . , 62n to thereby detect the radar targets as a set of detection events. This includes detecting, via each respective one of the CFAR subdetectors 62, . . . , 62n, a respective one of the radar target types via corresponding detection parameters inclusive of definitions of CUT cells 52. The ECU 30 then merges the set of detection events into a merged set of the detection events and thereafter executes a control action aboard the host vehicle 10 responsive to the merged set.

The present teachings may be used to possibly extend the detection range and reduce false alarms relative to CFAR detection strategies employing a single/point cell CFAR detector. The use of multiple parallel CFAR subdetectors 62 as disclosed herein maximizes the probability of detection of a given radar target at a given false alarm probability. Such multi-class detection may serve as valuable input for object-level detection and subsequent autonomous or semi-autonomous control actions aboard the host vehicle 10 of FIG. 1, as well as for alerting an operator to proximate obstacles in a more reliable and accurate manner. In this manner, the radar circuit 20 is better able to detect targets varying in shape and materials, e.g., from pedestrians to large vehicles, with dynamically changing positions and velocities.

While some of the best modes and other embodiments have been described in detail, various alternative designs and embodiments exist for practicing the present teachings defined in the appended claims. Those skilled in the art will recognize that modifications may be made to the disclosed embodiments without departing from the scope of the present disclosure. Moreover, the present concepts expressly include combinations and sub-combinations of the described elements and features. The detailed description and the drawings are supportive and descriptive of the present teachings, with the scope of the present teachings defined solely by the claims.

What is claimed is:

1. A radar circuit for use with a host system, the radar circuit comprising:
   a radio frequency (RF) signal generator configured to generate a predetermined RF waveform;
   a radio frequency (RF) antenna that is connected to the RF signal generator, wherein the RF antenna is configured to transmit the RF waveform toward a plurality of different radar target types, and to receive radar return signatures reflected from the plurality of different radar target types; and
   an electronic control unit (ECU) configured to receive the radar return signatures from the RF antenna, process the radar return signatures from the RF antenna using a plurality of parallel, target type-specific constant false-alarm rate (CFAR) subdetectors, each of the CFAR subdetectors having a corresponding plurality of cells under test, to thereby detect the radar targets as a set of detection events, merge the set of detection events into a merged set of the detection events, and execute a control action aboard the host system responsive to the merged set of the detection events, wherein the ECU is configured to generate a range-Doppler beam map when processing the radar return signatures;
   wherein each respective one of the CFAR subdetectors is configured to detect one or more of the radar target types in the corresponding plurality of cells under test using corresponding detection parameters.

2. The radar circuit of claim 1, wherein the each respective one of the CFAR subdetectors is configured to detect a corresponding one or more of the radar target types from amongst the plurality of different radar target types by comparing a power or energy threshold to a respective power or energy level of the corresponding plurality of cells under test, wherein the corresponding detection parameters include the power or energy threshold.

3. The radar circuit of claim 1, wherein the ECU is configured to merge the set of detection events or pass all of the detection events in the set of detection events using an object-level processing subroutine.

4. The radar circuit of claim 3, wherein the ECU is configured to selectively reject at least some detection events from the set of detection events using the object-level processing subroutine.

5. The radar circuit of claim 1, wherein the host system is a vehicle, and wherein the control action includes activating an alert aboard the vehicle.

6. The radar circuit of claim 5, wherein the vehicle is a motor vehicle having a driver assist subsystem, and wherein the control action includes changing a dynamic state of the motor vehicle via transmission of control signals to the driver assist subsystem.

7. The radar circuit of claim 1, wherein the CFAR subdetectors use a different number of the plurality of cells under test.

8. A method for detecting radar targets in a host system, the method comprising:
   generating a predetermined radio frequency (RF) waveform using an RF signal generator;
   transmitting the RF waveform, via an RF antenna connected to the RF signal generator, away from the host system and toward a plurality of different radar target types;
   receiving radar return signatures from at least some of the plurality of different radar target types via the RF antenna;
   processing the radar return signatures from the RF antenna via an electronic control unit (ECU) using a plurality of parallel constant false-alarm rate (CFAR) subdetectors to thereby detect the radar targets as a set of detection events, including detecting, via each respective one of the CFAR subdetectors each having a corresponding plurality of cells under test, a respective one or more of the radar target types in the corresponding plurality of cells under test via corresponding detection parameters, wherein processing the radar return signatures includes generating a range-Doppler beam map;
   merging the set of detection events, via the ECU, into a merged set of the detection events; and
   executing a control action aboard the host system via the ECU responsive to the merged set of the detection events.

9. The method of claim 8, wherein processing the radar return signatures includes, for each respective one of the CFAR subdetectors, detecting the corresponding one or more of the radar targets from amongst the plurality of different radar target types by comparing a power or energy threshold to a respective power or energy level of the corresponding plurality of cells under test, wherein the corresponding detection parameters include the power or energy threshold.

10. The method of claim 8, wherein merging the set of detection events includes using an object-level processing subroutine.

11. The method of claim 10, further comprising selectively rejecting at least some detection events from the set of detection events using the object-level processing subroutine.

12. The method of claim 8, wherein the host system is a vehicle, and wherein executing the control action includes activating an alert aboard the vehicle.

13. The method of claim 12, wherein the vehicle is a motor vehicle having a driver assist subsystem, and wherein executing the control action includes changing a dynamic state of the motor vehicle via transmission of control signals to the driver assist subsystem.

14. The method of claim 8, wherein processing the radar return signatures from the RF antenna via the ECU includes using a different number of the plurality of cells under test for each of the CFAR subdetectors.

15. A vehicle comprising:
a vehicle body; and
a radar circuit connected to the vehicle body and including:
- a radio frequency (RF) signal generator configured to generate a predetermined RF waveform;
- a radio frequency (RF) antenna connected to the RF signal generator, and configured to transmit the RF waveform away from the vehicle body and toward a plurality of radar targets of different target types, and to receive radar return signatures therefrom; and
- an electronic control unit (ECU) configured to receive the radar return signatures from the RF antenna, process the radar return signatures via a plurality of parallel constant false-alarm rate (CFAR) subdetectors to thereby detect the radar targets as a set of detection events, and execute a control action aboard the host system responsive to a merged set of the detection events, wherein the ECU is configured to generate a range-Doppler beam map when processing the radar return signatures;

wherein each respective one of the CFAR subdetectors has a corresponding plurality of cells under test and is configured to detect a corresponding one or more of the radar targets using detection parameters for a given one of the different radar target types, the detection parameters including a power or energy level in the corresponding plurality of cells under test, and each respective one of the CFAR subdetectors is further configured to detect the corresponding one of the radar target types by comparing the power or energy threshold to the power or energy level of the corresponding plurality of cells under teat; and wherein the ECU is configured to merge the set of detection events using an object-level processing subroutine into the merged set, and thereafter execute a control action aboard the vehicle responsive to the merged set.

16. The vehicle of claim 15, wherein the ECU is configured to selectively reject at least some detection events from the set of detection events using the object-level processing subroutine.

17. The vehicle of claim 15, wherein the control action includes activating an alert aboard the vehicle.

18. The vehicle of claim 17, wherein the vehicle is a motor vehicle having a driver assist subsystem, and wherein the control action includes changing a dynamic state of the motor vehicle via transmission of control signals to the driver assist subsystem.

19. The vehicle of claim 15, wherein the CFAR subdetectors use a different number of the plurality of cells under test.

20. The vehicle of claim 19, wherein the plurality of cut cells includes a 2×1 array of the cut cells and a 3×5 array of the cut cells.

* * * * *